Inventor
Herbert O. Naumann
By Rudolph S. Bley
Attorney

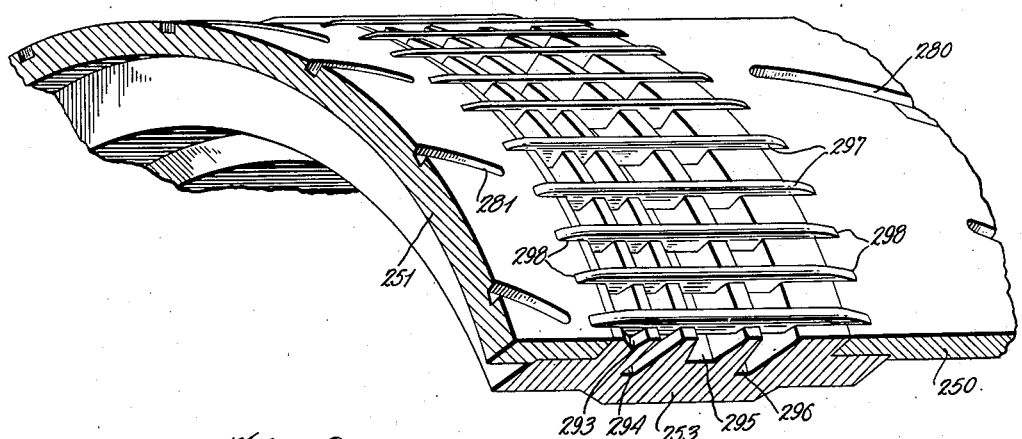
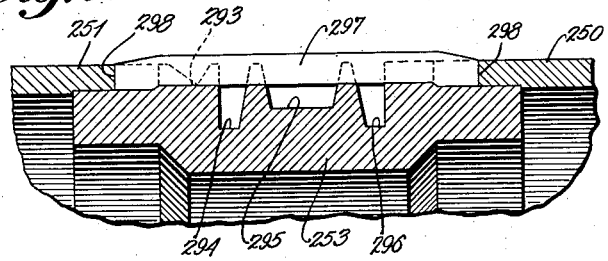
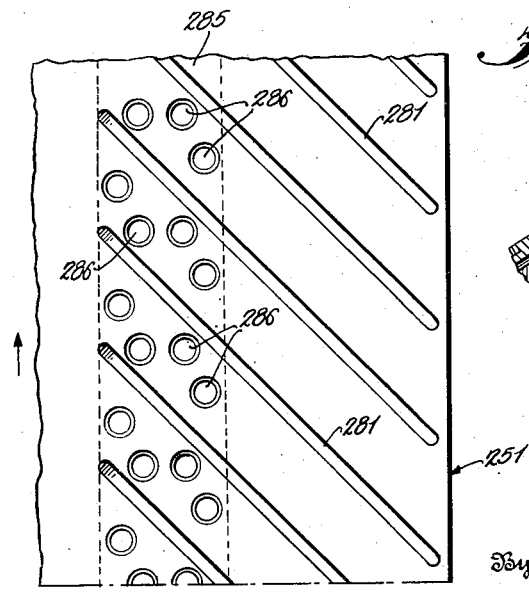
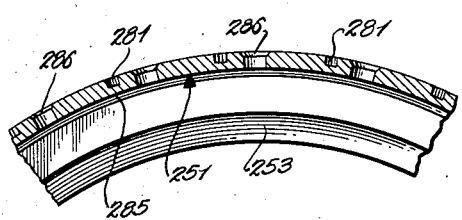

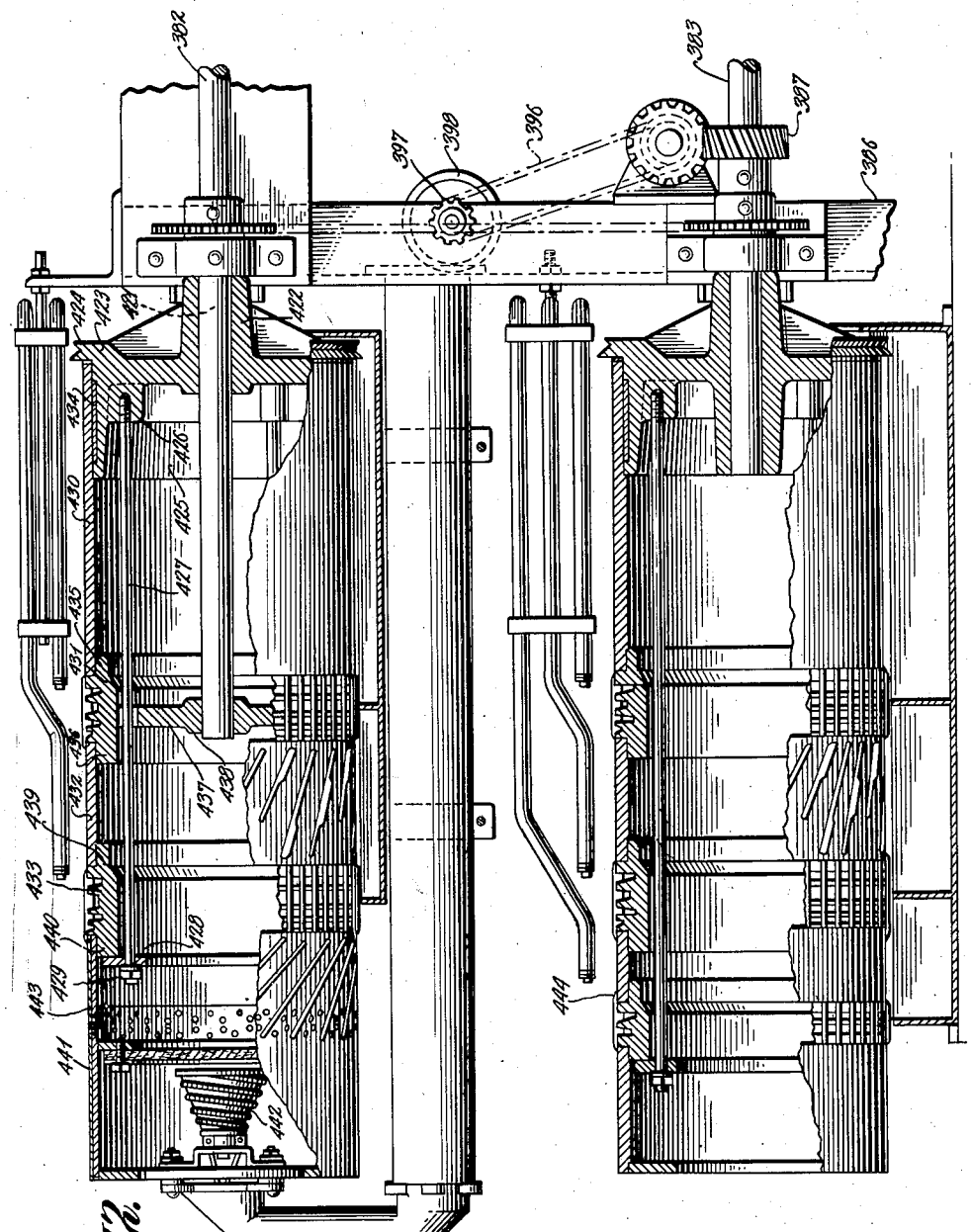

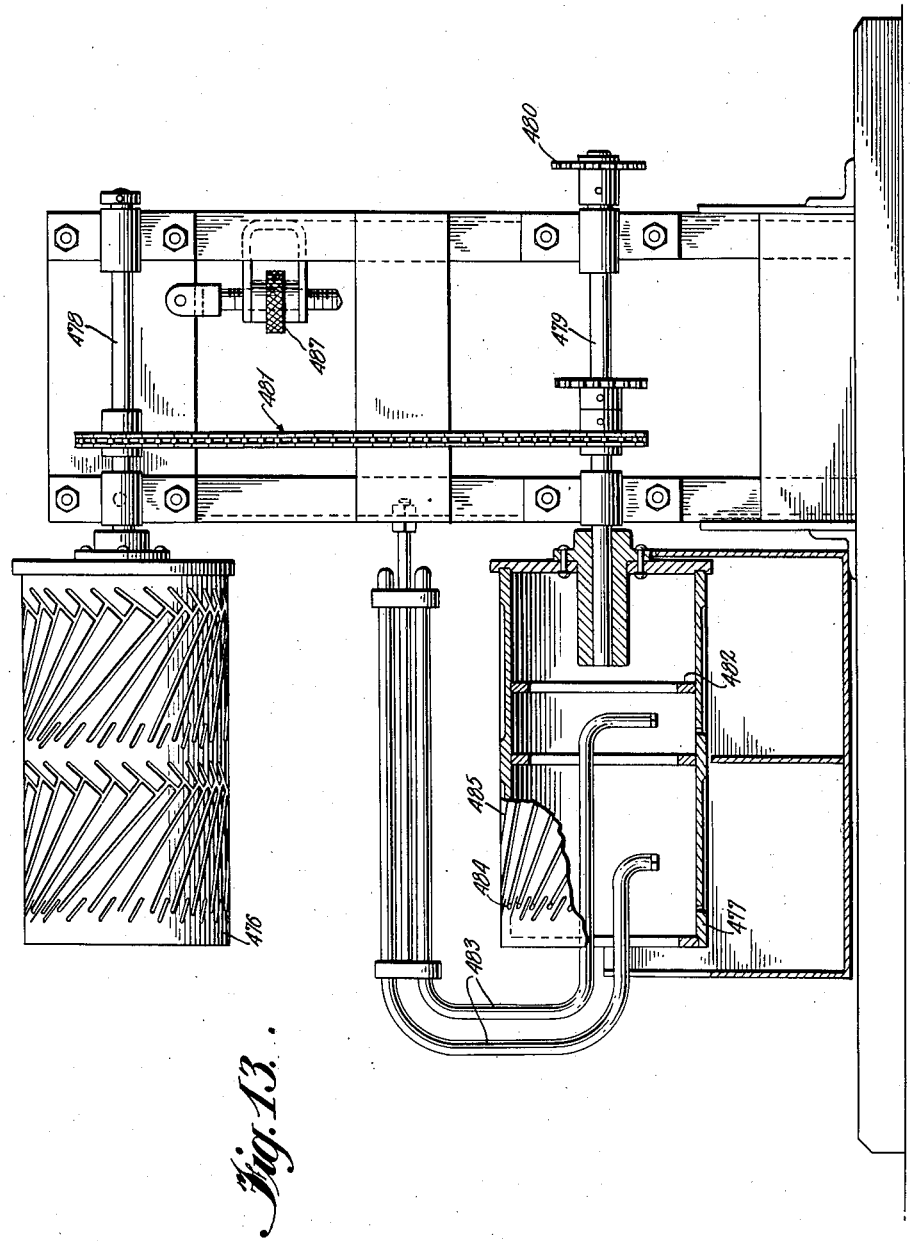

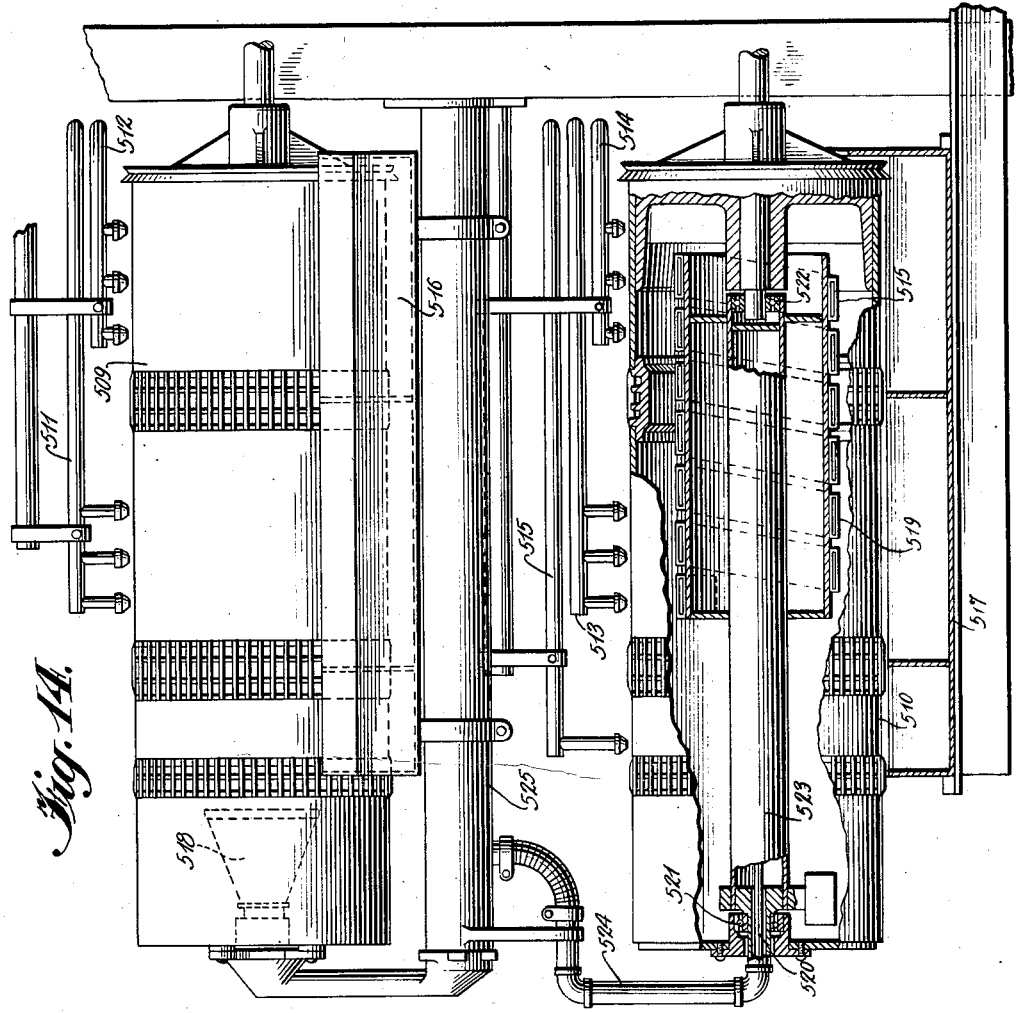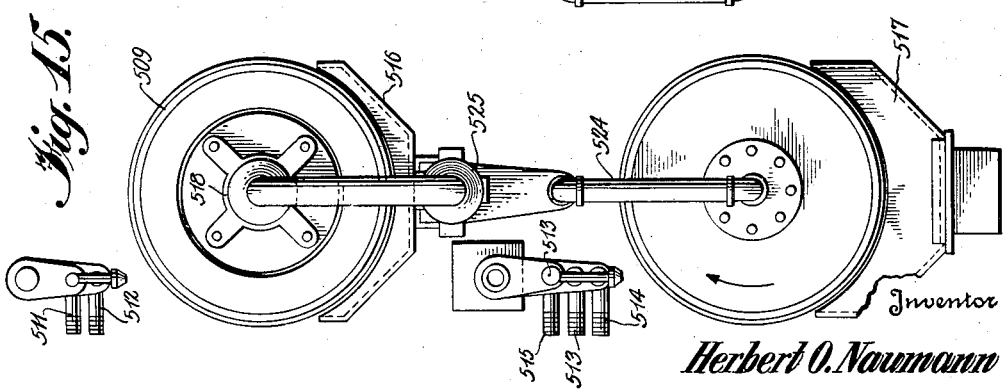

Patented July 19, 1949

2,476,757

UNITED STATES PATENT OFFICE 2,476,757

THREAD TREATING METHOD

Herbert O. Naumann, Elizabethton, Tenn., assignor to North American Rayon Corporation, New York, N. Y., a corporation of Delaware Original application July 14, 1942, Serial No. 450,934, now Patent No. 2,416,533, dated February 25, 1947. Divided and this application October 21, 1946, Serial No. 704,644

12 Claims. (Cl. 8—151.1)

This invention relates to the treatment of thread and is more particularly concerned with a process for the manufacture of wet spun rayon threads.

Generally speaking, the wet spinning of synthetic thread by the cake or package method embodies the extrusion of a spinning solution into a spin bath, the collection of the thread thus formed into packages either in the form of cakes, spool packages, or skeins, and then the subsequent liquid treatment and sometimes drying of the thread while it remains in package form.

Due to the fact that such packages comprise superposed and often tightly-wound layers of thread, it becomes necessary, in order to insure that each individual thread layer receives proper treatment, to force liquid through the package by means of pressure and/or vacuum.

The primary object of this invention is to facilitate the treatment of synthetic thread with liquids and to obviate the necessity for employing and handling cakes, spool packages or skeins. Another object is to expose uniformly each portion of a thread to treating fluids, under definitely controlled conditions and for adequate periods of time.

It is a further object of this invention to provide a method for producing finished wet spun threads, fully after-treated, dried, sized and twisted to a controlled extent, characterized by economy in the amount of chemicals used, in the control of their temperature, in the amount of space occupied, and in man hours per pound of thread produced.

The above and other objects may be attained by employing this invention, which embodies among its features directing a thread from a suitable thread source onto and around a thread-advancing thread-store device and applying treating liquids to separate zones of the thread-advancing thread-store device, by the action of the elements of which the treating liquids are distributed as films in their respective zones, and the thread is advanced in the form of a single layer of helices travelling progressively and substantially horizontally through the zones and through said films of liquids.

Other advantages of this invention will be apparent upon consideration of the following detailed description thereof in conjunction with the annexed drawings wherein.

Figure 3:
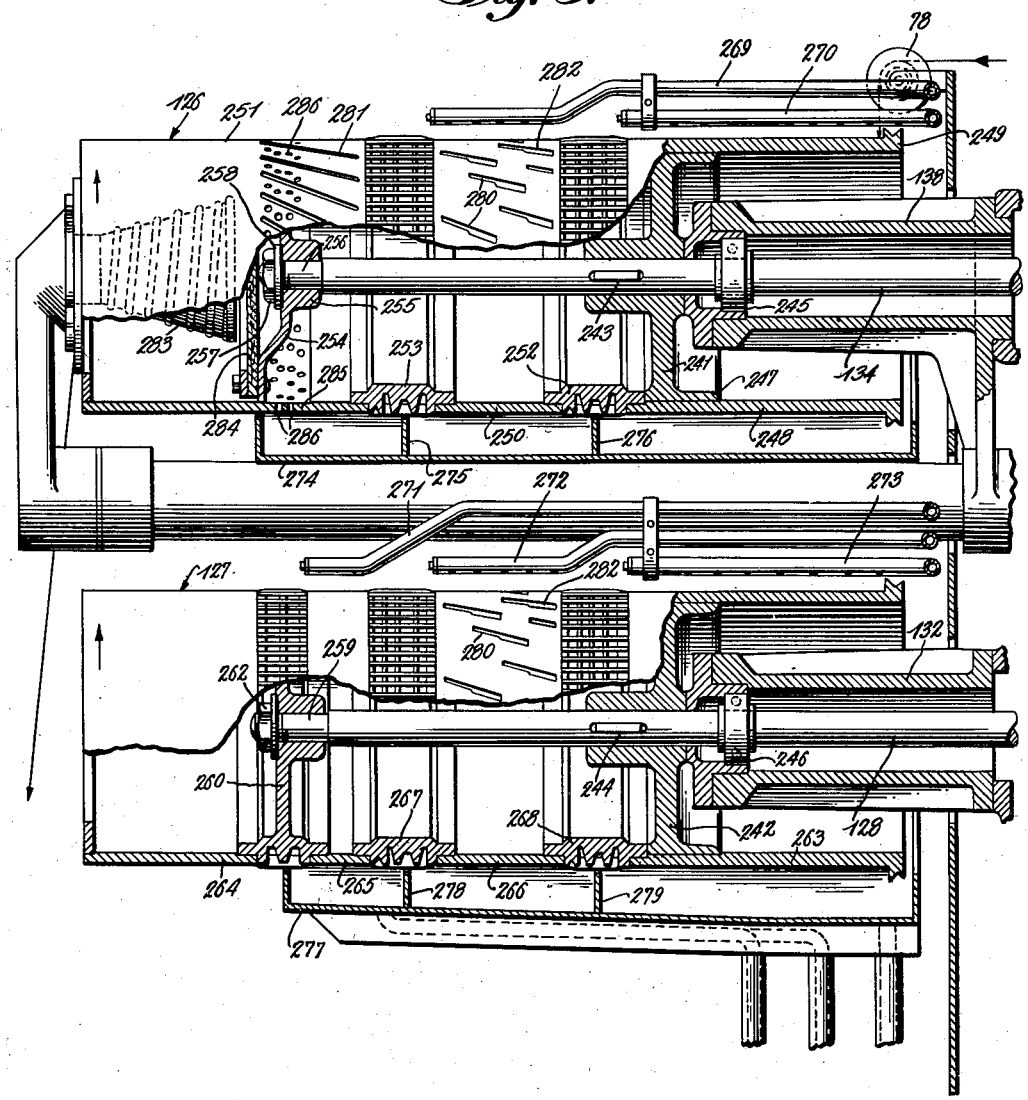
Figure 3 is a view partially in section and partially in side elevation of a thread-storage, thread-advancing unit typical of those employed on the finishing side of the machine of Figure 1.
Figure 16:
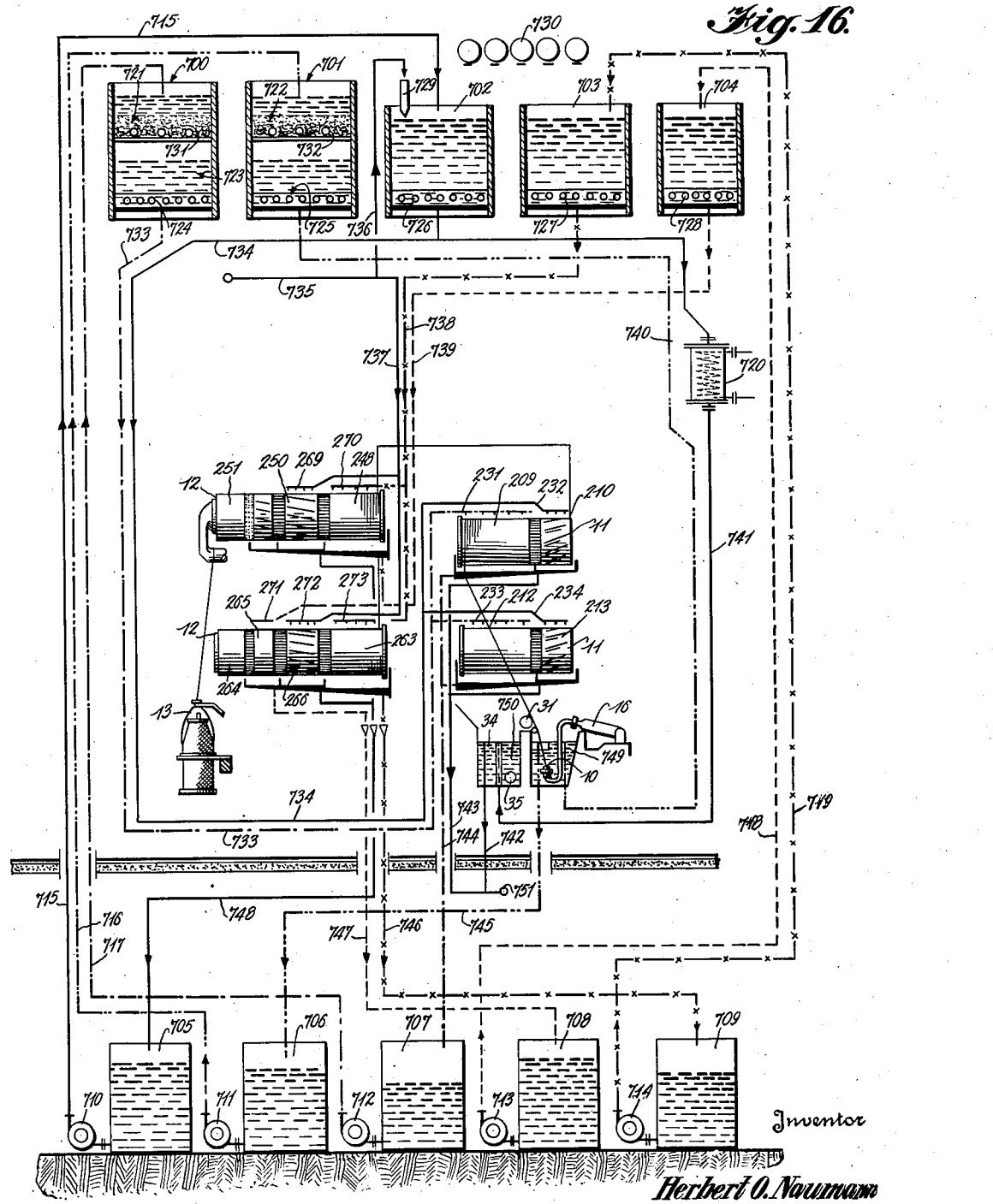

Figures 4, 5, 6, and 7 are developments illustrating the manner of disposition and function of different types of grooves cut in the surfaces of certain cylinders of thread-storage, thread-advancing units constructed according to this invention;

Figure 8 is a perspective view, to an enlarged scale, of a portion of the upper roller of the thread-storage, thread-advancing unit, illustrating the structural details of a liquid separation zone;

Figure 9 is a vertical section to an enlarged scale of a portion of the upper roller of the thread-storage, thread-advancing device of Figure 3 showing in detail the connection between sections of a roller and the structure of the liquid discharge zone between adjacent sections;

Figure 10 is a development of the cylindrical surface constituting a portion of the cooling zone of the upper roller of the thread-storage, thread-advancing device;

Figure 11 is a fragmentary view in section of the cylinder developed in Figure 10;

Figure 12 is a view partially in side elevation and partially in vertical section of another embodiment of a thread-storage, thread-advancing device of the type with which the finishing side of a spinning machine may be equipped;

Figure 13 is a view partially in side elevation and partially in longitudinal section illustrating a further modified type of thread-storage, thread-advancing device involving a treating liquid fed from the interior of the unit;

Figure 14 is a view partially in side elevation and partially in longitudinal section of a cantilever thread-storage, thread-advancing unit including temperature controlling means acting on the surface of the roller to which liquid treating media are applied;

Figure 15 is a view in elevation of the unsupported end of the unit of Figure 14; and Figure 16 is a flow sheet illustrating the method of supplying and circulating the liquids used with the rollers of the machines shown in the preceding figures.

Figure 1:
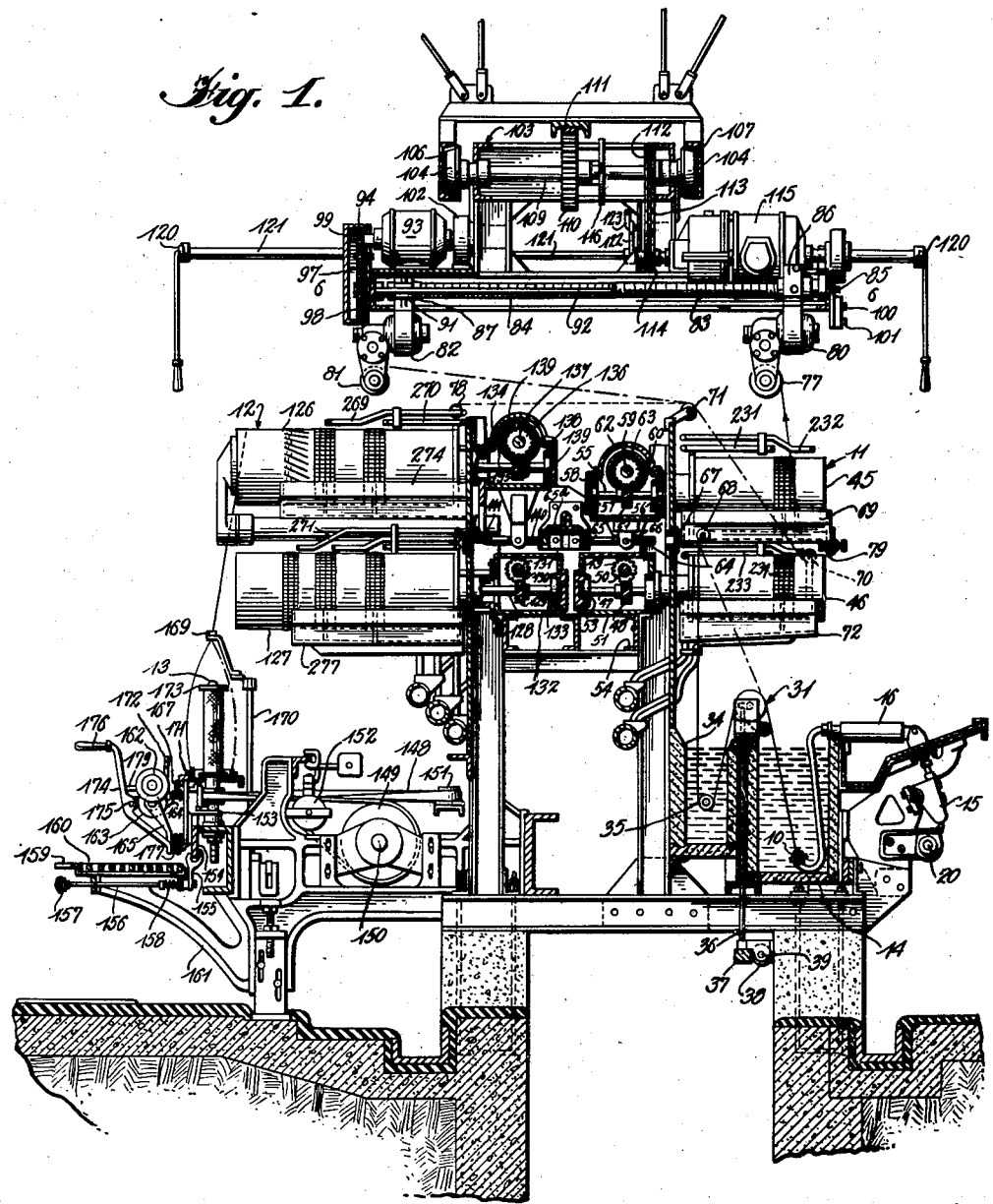
Figure 1 is an end view, partially in section, of a preferred type of continuous spinning machine adapted for practicing the method of this invention.

Referring now in detail to Figure 1, it will be seen that the spinning machine illustrated includes a number of spinning units, each consisting basically of a spinneret 10 and a pair of thread-storage, thread-advancing devices 11 and 12. On devices 11 and 12, the freshly formed thread is subjected to all required after-treatments, whereupon it is concurrently twisted and collected on twisting spindle 13 in finished form. For convenience in illustration, all of the component units of a continuous spinning machine constructed according to the present invention have not been illustrated. It is contemplated, however, that a single machine include some 50 to 70 spinning units arranged in alignment as illustrated. While it will be increasingly evident upon consideration of the following description that this invention is adaptable to any type of wet spinning operation involving the preparation of a thread in the form of a hydrated colloid, the apparatus will be specifically discussed in conjunction with the manufacture of viscose rayon.

Under actual thread manufacturing conditions, all of the spinnerets 10 are disposed in a single common spin bath container 14 which extends for the full length of the machine.

At spaced points along the length of the rear wall of spin bath container 14, godets generally indicated at 31 are provided, each of these consisting of a driven wheel 32 and a freely rotatable one 33. The thread issuing from each spinneret 10 is first led around the respective godet unit 31 and then through a bath trough 34 similar to trough 14, but adapted to contain hot water or hot acid depending upon the chemical requirements in any particular instance. In trough 34 the thread is passed around a freely rotatable guide 35 and then led to thread-storage, thread-advancing unit 11. The by-passing or use of trough 34 is entirely a matter of the chemistry of thread treatment and the thread may be led directly from godet 31 to thread-storage, thread-advancing unit 11 as illustrated by the dot and dash lines in Figure 1. Since the spinning machine of the present invention is adaptable to the manufacture of threads of widely varying characteristics, it is evident that means may be provided for varying the amount of stretch to be imparted to the thread in any particular instance. From the godet unit 31, around the wheels of which the thread is wound several times to prevent slipping, each thread is led to its respective thread-storage, thread-advancing unit 11 either directly or through bath trough 34. As can be seen in the drawings, each unit 11 is comprised of two generally horizontally extending rollers 45 and 46.

Although rollers 45 and 46 both extend generally horizontally, it is the usual practice to dispose the axis of roller 46 in a truly horizontal direction while that of roller 45 is slightly inclined with respect to the horizontal so that the axes of the two rollers constituting a unit 11 will intersect.

Inasmuch as roller 45 does not extend in a truly horizontal direction, it is evident that this roller will, when properly disposed with respect to roller 46, cause thread wound in a coil around the two rollers to move axially of the unit. In two-roller thread-storage, thread-advancing units thread drawn onto a roller will approach the same at a right angle to the direction of pull which is, of course, from the axis thereof. Thus, if roller 45 is slightly inclined with respect to the horizontal so that the axis thereof and that of roller 46 converge in the direction of their unsupported ends, thread wound around the two rollers will necessarily progress in the direction of convergence, i. e., toward the unsupported end of the unit. Since the spacing between adjacent connected coils is a function of the angle of convergence, it is also evident that the angle will determine the number of coils in unit 11 at any given time which, in turn, will control the duration of any treatment they may receive, during passage thereover, assuming a constant linear speed. Thus, in the interest of accurate control of the duration of the treatments to be accomplished on unit 11, the position of the axis of roller 45 is rendered adjustable by suitable means such as that shown in Figure 1. Rollers 45 and 46 which constitute unit 11 are arranged in such a way that their axes lie in the same vertical plane but are convergent in the direction of the unsupported end of the unit. It is evident that the axial feeding theory will likewise obtain in any arrangement involving at least two rollers, the axes of which intersect.

The thread leaving the godet 31 is passed around rollers 45 and 46 in the form of spaced connected coils. The thread is first led onto the upper cylinder 45 of unit 11 over a guide roller 68, located adjacent the supported end of cylinder 45, said guide roller being supported on a bracket extending from collection trough 69 which underlies roller 45. It is led off from the opposite side of upper roller 45 of unit 11, under a guide roller 70 adjacent the free end of the unit, over a guide roller 71 and from thence to a thread-storage, thread-advancing unit 12. The path of the thread to and from unit 11 is shown in Figure 1, the spaced coils wound around the rollers being omitted for convenience in illustration.

The carrying of the thread from unit 11 to unit 12 is effected by means of a transfer device diagrammatically shown at the top of Figure 1, which includes two alternately operated temporary collecting rollers 77, 81 driven by motors 80 and 82 respectively. The details and method of operating the transfer device are disclosed in my copending applications Ser. Nos. 489,554 and 489,555 filed June 3, 1943 issued as U. S. Patents Nos. 2,410,456 and 2,410,673, respectively, on November 5, 1946.

In the operation of unit 11, shafts 47 and 55 of cylindrical rollers 45 and 46, respectively, must be driven in such a way that the two cylinders of equal diameter have the same peripheral speed. This is best done by driving shafts 50 and 59 in synchronism from a common power source or by driving one shaft from the other. Arrows in Figure 1 serve to illustrate the direction of rotation of the rollers of unit 11.

Unit 12 is operated in analogous fashion. The gearing for driving both units is diagrammatically indicated in Figure 1 and is described in detail in my copending application Ser. No. 450,934, filed July 14, 1942.

The axial movement of the coils of thread from the supported toward the unsupported end of thread-storage, thread-advancing device 11 will occur only after that device has been threaded up and is in operation. The rollers of thread-storage, thread-advancing units 11 and 12 also have extremely important functions with regard to the manner and duration of the after-treatments to which thread is subjected during passage thereover.

Figure 2:
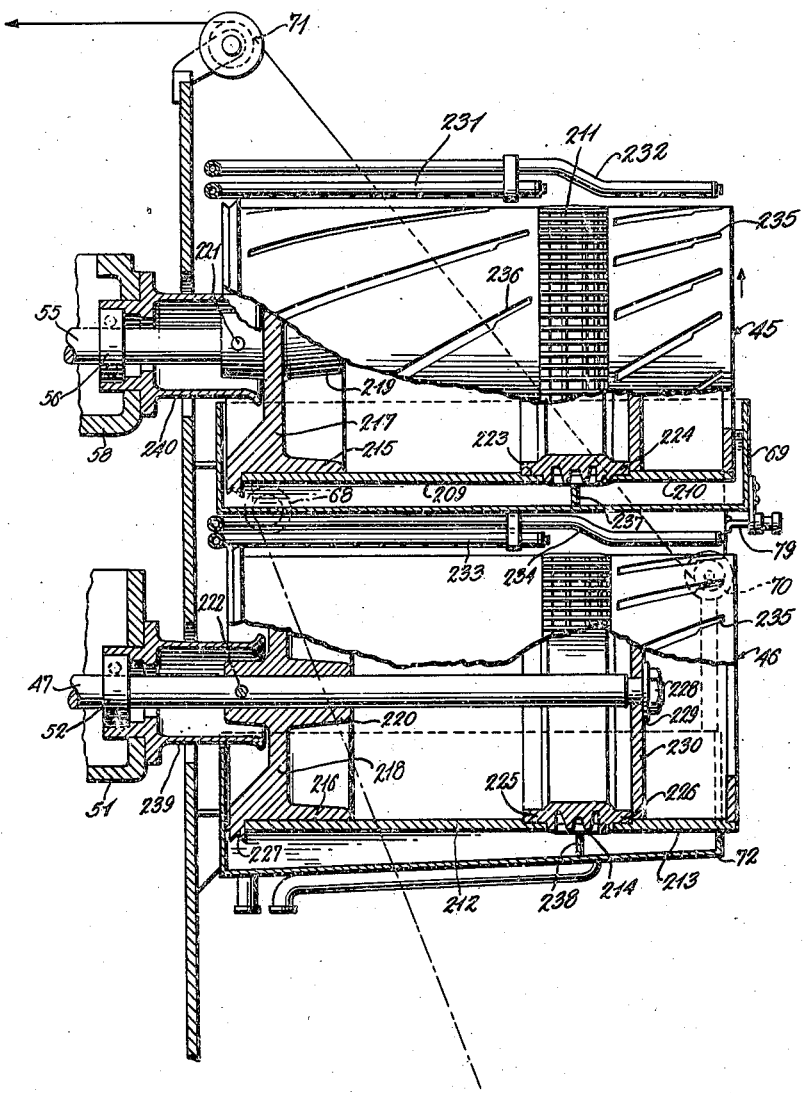
Figure 2 is a view partially in section and partially in side elevation of a thread-storage, thread-advancing unit typical of those employed on the spinning side of the machine of Figure 1.

The structural details of thread-storage, thread-advancing device 11 are illustrated in Figure 2. Rollers 45 and 46 are composite in nature, each consisting of two hollow cylinders spaced apart by annular members. Roller 45 is made up of hollow cylinders 209 and 210 between which a shouldered annular member 211 is interposed. Roller 46 is similarly constructed, consisting of hollow cylinders 212 and 213 separated by a shouldered annular member 214. Cylindrical portions 209 and 212 are sweated or pressed over cylindrical supporting surfaces 215 and 216, respectively, said supporting surfaces being integral with spiders 217 and 218, respectively, having hubs 219 and 220 keyed at 221 and 222 to shafts 55 and 47. The unsupported end of cylinder 209 is fitted over shoulder 223 of annular member 211 and an end of cylinder 210 is similarly arranged with respect to the shoulder 224 thereof. A like construction obtains in roller 46 where the free end of cylinder 212 fits over shoulder 225 of annular member 214 while an end of cylinder 213 fits over its shoulder 226. So that cylinders 212 and 213 with their interposed annular member 214 may be held as a unit to form roller 46, they are compressed between an annular flange 227 extending outwardly from spider 218 and a nut 228 threaded onto an end portion of shaft 47 and bearing through a washer 229 against a disc 230 fixed to cylinder 213. The construction shown and described in detail in connection with roller 46 likewise obtains with respect to roller 45.

While the two cylinders and the associated annular member making up each of rollers 45 and 46 function as a unit so far as thread-storage, and thread-advancing are concerned, the cylinders and interposed annular members have different functions with regard to the application of treating liquids to the thread. Thus, liquids are sprayed individually on the surfaces of cylinders 209, 210, 212 and 213. This is effected by disposing discharge pipes above the various cylinders, see Figure 2. Pipe 231 is above cylinder 209, pipe 232 is above cylinder 210, pipe 233 is above cylinder 212 and pipe 234 is above cylinder 213. These pipes are perforated on the underside so that liquids passing therethrough will be discharged in the form of a spray onto the surface of the underlying cylinder. As has been previously indicated, the cylinders illustrated in Figure 2 are intended for rotation in a clockwise direction, as viewed from their unsupported ends. For this reason, the spray pipes are disposed on the left-hand side of the rollers 45 and 46 as viewed from their unsupported ends. This is to aid in the distribution of liquid over the respective cylindrical surfaces. Since thread moving on thread-storage, thread-advancing device 11 will pass around both rollers in the form of a coil, it is evident that the same treating liquid will be supplied by pipes 231 and 233 to cylinders 209 and 212 while a different liquid may be supplied from pipes 232 and 234 to cylinders 210 and 213. Because of the fact that the apertures in the various pipes are more or less evenly distributed over the axial length of the respective cylinders, the liquid distribution over the surface of the cylinders would be apparently quite even. It has been found, however, that only liquids of low surface tension having good wetting out properties will form a cylindrical film of substantially constant thickness over the full axial length of a smooth cylindrical surface. Other liquids with low wetting out characteristics tend to form relatively thick annular bands directly under each pipe outlet, the intervening spaces being inadequately covered. Since controlled duration of liquid treatment goes to the very essence of after-treatment of wet spun threads of synthetic origin, smooth cylindrical treating surfaces are wholly unsuitable for some of the after-treatments requisite to the production of high quality thread. The surfaces of the component cylinders of rollers 45 and 46, however, are arranged in a manner to overcome the difficulty heretofore encountered and to distribute any treating liquid over a cylindrical zone of predetermined axial length in the form of a film of uniform thickness throughout its length. Thus, by knowing the linear speed of thread travel over a cylindrical treating surface, the axial length of that surface, the diameters of the two cylinders constituting a treating zone, and the coil spacing in that zone, it is possible accurately to predetermine the time period that any given point on a thread will be subjected to a given chemical treatment. Since the angle of convergence of the rollers is a function of coil spacing and since that angle is an adjustable one while the component cylindrical sections of each roller are removable, see nut 228 in Figure 2, it is evident that both the coil spacing in a zone and the axial length thereof may be altered to meet different treatment requirements.

The uniform distribution of liquids over the surfaces of cylinders 209, 210, and 213, as well as the rate of axial movement of such liquids, is controlled by grooves 235 and 236 cut in the cylindrical surfaces. These grooves move liquids sprayed on the cylinders 210 and 213 from right to left as viewed in Figure 2. To prevent intermixture of liquids on cylinder 210 with those on cylinder 209 and similarly to prevent intermixture of liquids on cylinder 213 with those on cylinder 212, the respective annular members 211 and 214 are exteriorly grooved. The detailed structure and function of these grooves will be hereinafter more fully set forth. However, since these grooves prevent intermixture of the liquids on adjacent cylinders, partitions 237 and 238 in troughs 69 and 72 extend under the respective central grooves of annular members 211 and 214 so that the liquids discharged from adjacent cylinders may be separately recovered.

Flange 227 on spider 218 serves to prevent any treating liquid, which may be corrosive in nature, from reaching bearing 52. As a further protective step in this connection, a housing 239 extends over hub 220 of spider 218, said housing being attached to main housing 51. A similar arrangement involving a housing 240 obtains in connection with the assembly of upper roller 45.

Thread-storage, thread-advancing unit 12 is composed of two rollers 126 and 127 which have been in part described. These rollers are driven from shafts 134 and 128, respectively, through spiders 241 and 242, keyed respectively at 243 and 244, as can be seen in Figure 3.

Spider 241 is provided with a cylindrical portion 247 over which a cylinder 248 is pressed. This cylinder is provided with an annular flange 249, similar in function to flange 227. Roller 126 is made up in much the same manner as rollers 45 and 46 and includes, in addition to cylinder 248, cylinders 250 and 251, and shouldered annular members 252 and 253 similar to members 211 and 214, shown in Figure 2. The cylinders are fitted over the shouldered portions of annular members 252 and 253 in the same manner as cylinders 209 and 210 are fitted over the shoulders 223 and 224 of annular member 211. Integral with or attached to cylinder 251 is a spider 254 provided with a central hub 255 through which the threaded free end 256 of a shaft 134 is passed. A nut 257 may be drawn against a washer 258 to pull cylinder 251 toward cylinder 248, thereby holding the intermediate annular members and cylinder 250 so that the entire assembly may function as a unit.

Practically an identical arrangement is used in drawing together the component parts of roller 127.

Figure 4:
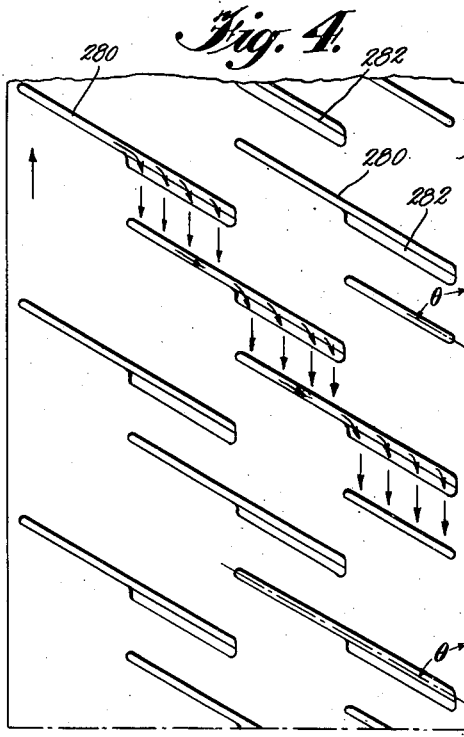

As is the case with unit 11, the various cylinders making up unit 12 are provided with liquid supply pipes as may be seen in Figure 3. Thus, a pipe 269 supplies liquid above cylinder 250 and similar pipes 270, 271, 272 and 273 perform a corresponding function in connection with cylinders 248, 265, 266 and 263 respectively. Underlying cylinder 126 is a collection trough 274 having partitions 275 and 276 underlying respectively annular members 253 and 252. In this way, liquid supplied to the various component cylinders of roller 216 may be separately recovered. A trough 277 underlies roller 127 and this trough is partitioned at 278 and 279, the partitions underlying respectively annular members 267 and 268. Figure 3 shows that cylinders 250 and 266 are provided with grooves 280 and that there are some grooves 281 at the right-hand side of cylinder 251. These grooves and grooves 235 and 236 of Figure 2 function to distribute liquids over the surface of the cylinders in which they are located, the liquids being supplied from the pipes disposed above the particular cylinder. The structure and function of these grooves will be explained in connection with grooves 280 disposed on cylinder 250 of roller 126. The grooves are disposed helically about the surface of cylinder 250, although on that cylinder no single groove extends for the full axial length of the cylinder. For convenience in explaining the operation of grooves 280, a portion of the surface of cylinder 250 is developed in Figure 4. The grooves 280 extend at an angle $\theta$ to a plane at right angles to the axis of the cylinder, which, of course, is also the axis of the helix. Since the direction of rotation of the rollers is counterclockwise as they are viewed from their unsupported ends, a drop of liquid lodged in a groove 280 after having been sprayed through apertures in pipe 269 will have a tendency due to inertia, to remain stationary. The cylinder, however, rotates in a counterclockwise direction so that as a result of the inertia of the liquid it is caused to progress in an axial direction toward the supported end of the rollers 126 along the groove. The rate of liquid flow in an axial sense will be dependent upon the magnitude of angle $\theta$. As viewed in Figure 4, the liquid moves from left to right. On the other hand, if the developed cylinder there shown were rotated in the opposite direction, the liquids would move from right to left. So far as thread treatment is concerned it is desirable to have movement of the liquid and distribution thereof in the form of a continuous film over the surface of the cylinder in position to contact the coils of thread. Grooves 280 are therefore provided with flared portions 282. The flared portions 282 are of greater width but, on one side, of lesser depth than the respective grooves and serve to cause the liquid to spread out and move circumferentially as a film until it is picked up by the next groove which recommences axial movement, as indicated by the flow arrows in Figure 4. Because of the grooves 280 and the flared portions 282 thereof, liquids sprayed on cylinder 250 from pipe 269 will be well distributed over the cylinder and will move axially as a film toward the supported end of roller 126. This movement is quite distinct from any movement brought about by reliance on gravitational force since shaft 134 of roller 126 slopes downwardly in the direction of the unsupported end of the unit. Thus, liquids moved in the direction of the supported end of the unit, are, on the surface of cylinder 250, moved upwardly. Since shaft 134 slopes downwardly, while shaft 128 is in a truly horizontal position, it is evident that if the same helix angle for grooves 280 were to be used on cylinders 250 and 266, the rate of liquid movement on cylinder 266 would be greater than the rate of liquid movement on cylinder 250. To compensate for this, the angle $\theta$, see again Figure 4, is of greater magnitude for the grooves 280 on cylinder 250 than for the grooves 280 on cylinder 266, i. e., for cylinder 250, $\theta$ more nearly approaches 45°. By compensation, it is therefore possible and intended that the liquids shall move at the same rate on the surface of cylinders 250 and 266, in the former case against the force of gravity.

It will be noted that while grooves 235, 236, 280 and 281 are all helically disposed, the configuration of each is somewhat distinct so as to adapt the grooves to the particular treatment contemplated on the cylinder on the surface of which they are cut. Where the liquid treatment is a mechanical one, such as washing, rapid counterflow of liquid is desirable. Thus, grooves 235 in cylinders 210 and 213 are disposed in such a manner as to insure both rapid flow and rapid distribution. The washing water supplied through pipes 232 and 234 is moved in considerable volume and fairly rapidly from right to left, as viewed in Figure 2. Thus, the thread leaving unit 11 is in contact with fresh water while the thread entering cylinders 210 and 213 is contacted first with water which has therein certain impurities removed from the thread. In the treatment of freshly spun viscose yarn, the liquid applied to cylinders 209 and 212 is an acid. This acid is subsequently removed by washing on cylinders 210 and 213. Since the acid treatment effected on cylinders 209 and 212 is chemical in nature rather than mechanical, liquid movement on roller 212 is not necessary. The acid has good wetting out properties and spreads fairly evenly over cylinder 212 in the form of a film through which the thread is passed. Of course, cylinder 209 is used in the same treatment. This cylinder, however, is not disposed truly horizontally, but slopes in the direction of the unsupported end of the unit. Thus, grooves 236 are provided for the purpose of counteracting the effect of gravity.

In the after-treatment of freshly spun viscose yarn, cylinders 248 and 263 of unit 12 can be conveniently employed as a desulphurizing zone. The desulphurizing liquid has been found to be self-distributing, the treatment is a chemical one, and for that reason, the surfaces of cylinders 248 and 263 need not be grooved. Cylinders 250 and 266 constitute another washing zone. Here substantial quantities of water are supplied to the cylinders and are moved from left to right, as viewed in Figure 3, in a manner hereinbefore explained in connection with Figure 4. Cylinder 265 is used for the application of a finishing solution to the thread. This solution need not be supplied in large amounts and having a low surface tension, is more or less self-distributing.

Consequently, cylinder 265 is not provided with grooves to cause axial movement of the liquid supplied from pipe 271. Since only a small amount of the finishing solution is applied to the thread, no similar zone on roller 126 is required. However, a portion of cylinder 251 extends over cylinder 265 and the former, near its unsupported end, is provided with a heating unit 283 which is in registry with cylinder 264 of roller 127, as described in Patent No. 2,244,745. A heat insulating disc 284 serves to divide the interior of cylinder 251 into two portions and prevents the radiation of heat into the portion of cylinder 251 which is in vertical registry with cylinder 265. The surface of cylinder 251, however, is of a heat conductive material. Thus, to prevent the surface conduction of heat along cylinder 251 beyond disc 284, a cooling zone 285 is interposed. This cooling zone is best viewed in Figures 10 and 11. The thickness of cylinder 251 is reduced at annular zone 285 and a number of perforations 286 are provided therein. These allow the atmospheric air in the spinning rooms to pass through a portion of the cylinder to cool the same. Grooves 281, on the surface of cylinder 251 tend to move any finishing solution carried by the thread from cylinder 265 to cylinder 251 to the right of the letter, as it is viewed in Figure 3, so that it cannot get onto the heating zone.

Figure 5:
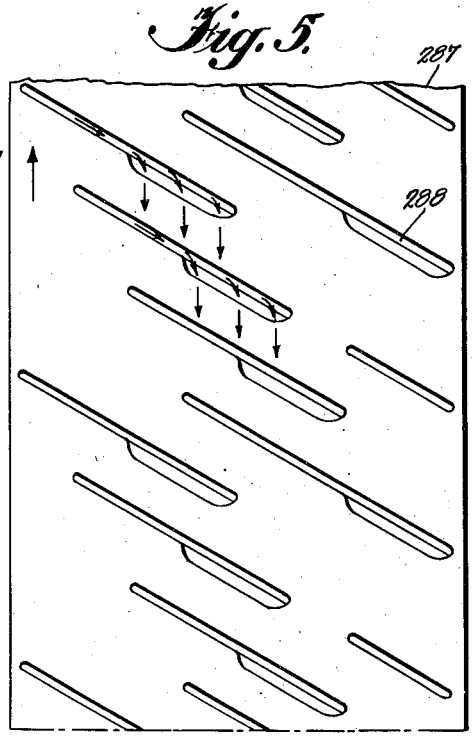
Figure 6:
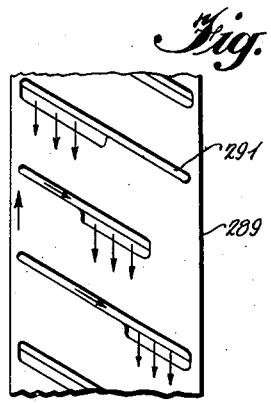
Figure 7:
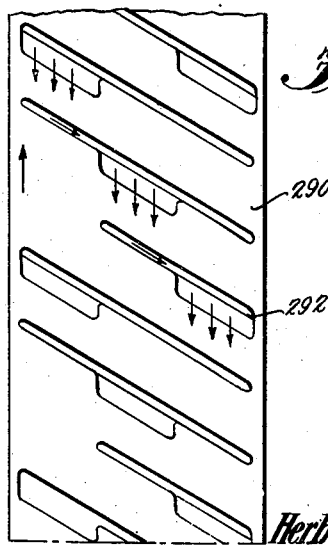

The grooves shown in Figures 2 and 3 do not constitute the only possible arrangements for the distribution and movement of liquids over treatment cylinders. In Figure 5, a developed cylinder 287 is shown having flared grooves 288 cut in the surface thereof. The various helical grooves are circumferentially spaced about the surface of the cylinder so that the flare of one groove is partially in registry with the deep portion of the adjacent groove and partially in registry with the flared portion thereof. The flow arrows in Figures 4 to 7 illustrate the liquid distribution. The discharge of the used treating liquid from the various cylinders and the individual recovery of the treating liquids without contamination brought about by admixture of liquid supplied to adjacent cylinders is effected by the means shown in Figures 8 and 9 in which the grooved outer surface of shouldered annular member 253 is illustrated.

In Figure 8 shouldered annular member 253 is disposed between cylinder 251 and 250. The exterior surface of annular member 253, which lies between the surfaces of cylinders 250 and 251, is provided with four annular grooves 293, 294, 295, and 296. These grooves are of varying depths, as shown in Figure 9. The peripheral speed and the radius of all of the cylinders constituting units 11 and 12 are so corelated that liquids will not be thrown off those cylinders by centrifugal force. Any liquid moved by grooves 281 from left to right on cylinder 251 will eventually come to groove 293 in annular member 253. The peripheral speed of roller 126 is so corelated with its diameter that the tendency to discharge from groove 294 will be substantially balanced by gravity during that portion of the rotation in which gravity acts counter to centrifugal force whereas during another portion thereof gravity will act concurrently with centrifugal force so as to permit liquid to discharge from groove 293 into underlying trough 274. The amount of liquid entrained by the thread and delivered to the surface of cylinder 251 is so slight that groove 293 can discharge the liquid as fast as it is delivered; groove 294 has the same function as groove 293 and acts cumulatively with the latter to discharge liquids when they are supplied to groove 293 faster than that groove can effect the discharge. Groove 295 is normally dry and may be considered the separation groove; no liquids moving from cylinder 251 will be able to progress beyond groove 294 in an axial sense.

While grooves 293, 294, 295 and 296 in annular member 253 and the corresponding grooves in the other annular member serve to positively separate liquids on adjacent cylinders against admixture and provide for separate recovery of each liquid so that it may be recirculated through a control station and used again, it is evident that the passage of thread along the cylinder in the form of a large number of spaced connected coils would be prevented by such grooves. An arrangement is provided to permit use of discharge grooves and consisting of a plurality of circumferentially spaced bridges 297, each extending axially of the roller, disposed above annular member 253. Thus, the thread is supported by bridges 297 as it passes above grooves 293, 294, 295 and 296.

It is apparent that a single coil of thread in passing around any of the cylinders of either of the units 11 or 12 defines an arc of substantially 180°. Disposition of the thread on bridges 297, however, is not arcuate but polygonal. Thus, if the surface of bridges 297 lay exactly flush with the surface of cylinders 250 and 251, the thread path over the bridges would define a polygon of lesser periphery than the periphery defined on the adjacent cylinders.

In operation this would be evidenced by wobbling of the thread in the separation zones, a tendency which would be augmented by the substantial quantities of liquid contained in the groove underlying the bridges. To counteract this effect, bridges 297 are raised in such a way that the polygonal path defined by the thread passing thereover is equal to, or very slightly in excess of, the length of the arcuate thread path on the adjacent cylinders. This arrangement keeps the thread in position during passage over the various annular members. It can be noted in any of Figures 2, 3, 8 and 9 that the upper surface of each bridge 297 is curved so that the bridge rises in a gentle curve from a point flush with the surface of an annular member between the grooves to a point above that surface and then back to it again, see in particular Figure 9.

Figure 12 shows another modification. Here the parts of the roller are held together by threaded sockets 426 which receive threaded rods 427 passing through retaining plates 428, nuts 429 being used to draw up the assembly. The roller sections are indicated by 430, 432, and 441. The end support elements of the roller portions are designated by 421, 422, 423, 424 and 425. 434 designates a suitable packing. The separation zones are indicated by 431 and 433, the former being an annulus provided with grooves and with shoulders 435 and 436. The drive means is represented by shafts 382, 383, gears 387, 397, 398 and chain 396. The numeral 386 represents a support.

Another modification of the present invention is illustrated in Figure 13, a single thread-storage, thread-advancing unit being shown, although a plurality of such devices may be arranged in alignment to be driven from a common source, one arranged to serve each spinning place. The unit consists of an upper and a lower roller designated by numerals 476 and 477. These rollers are mounted on shafts 478 and 479 driven from a sprocket 480 keyed to the shaft 479 which is connected to shaft 478 by a chain and sprocket system designated generally at 481. Roller 477 is hollow and is subdivided into interior zones by baffles 482. Into each zone a liquid is led by a pipe 483 and the liquid passes through apertures 484, to the exterior surface of the roller. The apertures are in registry with grooves, the grooves serving to move the liquids axially along the rollers in the direction of their supported ends.

Figures 14 and 15 show a two-unit thread-storage, thread-advancing device of a construction similar to that of Figure 1. An upper roller 509 and a lower roller 510 constitute the unit. The surface and the construction of the bridged separation zones of rollers 509 and 510 may be similar to the corresponding portions of rollers 126 and 127 disclosed in Figure 1 and hereinbefore previously described. Rollers 509 and 510 are provided with liquid supply pipes 511, 512, 513, and 514 having discharge jets directed at the surface of the respective rollers. Lower roller 510 is provided with an additional treating liquid supply pipe bearing the numeral 515 and intended to function similarly to the corresponding pipe shown in Figure 1. Since pipe 515 is for the application of a sizing material, no corresponding element is necessary in connection with roller 509. Partition drain troughs 516 and 517 underlie the various treatment zones on rollers 509 and 510 respectively. These serve to collect the liquid distributed over the surface of the rollers and to return them to a point of regeneration from whence they may be recirculated to treating position. Heating unit 519 is adapted to radiate heat to the inner surface of roller 510, the material of said roller transmitting the heat by conduction to the outer surface thereof. Figure 16 represents a flow sheet for indicating the method in which the liquids are supplied to the various rollers during the treatment of the thread.

In producing and treating thread, viscose solution is extruded through spinning nozzle 10 into an acid spin bath to form a coagulated thread therein which is led over godet 31 to the thread-advancing, thread-storage device 11. The thread is treated on cylinders 212 and 209 with hot water or hot acid of a temperature of about 80° C. and thereafter on cylinders 210 and 213 with water of a temperature preferably of about 60 to 70° C. The thread is then led to treatment cylinders 248 and 263 on which it is desulphurized. The desulphurizing solution comprises preferably a 3.5% aqueous solution of sodium sulphite maintained at a temperature of about 80° C. The desulphurized thread is then treated on cylinders 250 and 266 with water of a temperature preferably of about 60 to 70° C. to remove residual sodium sulphite therefrom. The washed thread is then sized on cylinders 265. Any conventional textile finishing solution or emulsion may be used for this purpose. The finished thread is then dried on cylinders 251 and 264 and thereupon led to twisting device 13. When it is desired to spin high-strength yarn the coagulated thread is led from the spinning nozzle 10 into a bath comprising either hot water or hot acid. The thread is then led to the thread-advancing, thread-storage device 11. Suitable stretch is imparted to the thread and the spin bath may be continuously recirculated in a closed system. Water or acid dripping from the treatment cylinders is collected and recirculated through the system. The desulphurizing solution may also be constantly circulated in a closed system and the same applies to the finishing solution. The thread is dried on cylinders 251 and 264 by means of a heating device inserted into cylinder 251. The temperature of cylinder 251 is adjusted to produce a yarn having a desired moisture content, e. g. about 11% based upon the cellulose content of the yarn.

Figure 16 shows in diagrammatic form a preferred embodiment of a liquid supply and circulation system suitable for use in connection with the treatment method described above. The details and operation of the components of this system are set forth in my copending application Serial No. 450,934 filed July 14, 1942.

Although use may be made of any conventional spin bath for coagulating the extruded viscose threads the spin bath preferably comprises about 150 to 216 grams of sulphuric acid, about 80 grams of magnesium sulphate and about 7 grams of zinc sulphate per liter of water, this bath being preferably maintained at a temperature of about 43° C. Although any known desulphurizing agent may be used in the process it is preferred to employ a desulphurizing solution containing about 35 grams of sodium sulphite per liter of water since it has been found that this solution, when maintained at a temperature of about 80° C. will substantially completely desulphurize the thread. Although the water and/or acid on cylinders 209 and 212 or in trough 34 may be used at a temperature below and above 80° C. (about 60 to 90° C.) it has been found that the optimum results are obtained when these baths are maintained at a temperature of about 80° C.

The process may be modified to allow wet spinning of any other synthetic thread. Thus, it is possible, with adequate changes of the treatment baths, to spin cuprammonium solutions, solutions of cellulose esters, polymerized hydrocarbons and derivatives thereof, etc. Modification of the process and the apparatus will readily be foreseen by those skilled in the art, and I desire to include all modifications and variations coming within the scope of the appended claims.

This is a division of my application Serial No. 450,934, filed July 14, 1942, entitled, "Process and apparatus for the manufacture of synthetic yarn," issued as U. S. Patent No. 2,416,533 on February 25, 1947.

What is claimed is:

1. A method for the treatment of thread that comprises forming a plurality of cylindrical, adjacent, substantially independent, rotating bodies of treating liquid in substantially horizontal arrangement and in axial alignment, independently feeding treating liquids to the respective bodies and separately withdrawing liquids therefrom while effecting axial propulsion of the liquids toward the respective points of withdrawal, moving succeeding portions of the thread helically through the respective liquid bodies in succession and collecting the thread.

2. A method for the treatment of thread that comprises forming a plurality of hollow, cylindrical, adjacent, substantially independent, rotating bodies of treating liquid in substantially horizontal arrangement and in axial alignment, independently feeding a treating liquid to each body along its axial length while axially displacing succeeding portions of the component liquid of the body toward one end thereof, separately discharging the treating liquid from each body at said end thereof at a rate correlated with the rate of feed and rate of axial movement to maintain the thickness of the body at a predetermined value, moving succeeding portions of the thread helically through the respective liquid bodies in succession and collecting the thread.

3. A method for the treatment of thread that comprises forming a plurality of hollow, cylindrical, adjacent, substantially independent, rotating bodies of treating liquid in substantially horizontal arrangement and in axial alignment, independently feeding a treating liquid to each body along its axial length while independently axially displacing succeeding portions of the component liquid of each body toward one end thereof, stopping the axial displacement of liquid at said end to cause a localized annular zone of increased thickness resulting in discharge of the liquid from the body at said zone, moving succeeding portions of the thread helically through the respective liquid bodies in succession and collecting the thread.

4. A method for the treatment of thread that comprises forming a plurality of hollow, cylindrical, adjacent, substantially independent, rotating bodies of treating liquid in substantially horizontal arrangement and in axial alignment, each body rotating at a constant speed throughout its length and all of said bodies rotating at the same speed, axially displacing succeeding portions of the component liquid of each body toward one end thereof while continuously, independently replenishing the displaced liquid, the rate of axial displacement of liquid being more rapid in some bodies than in others, stopping the axial displacement of liquid at that end of each body toward which displacement occurs to cause the formation of a localized liquid zone of increased thickness which results in discharge of liquid from the body in the 180° of the annular zone that lie below a horizontal plane diametrical of the body, moving succeeding portions of the thread helically through the respective liquid bodies in succession and collecting the thread.

5. A method for the treatment of thread that comprises forming a plurality of hollow, cylindrical, adjacent, substantially independent rotating bodies of treating liquid in substantially horizontal arrangement and in axial alignment, axially displacing components of the body toward one end thereof, replenishing the displaced liquid at a rate correlated with the rate of displacement to maintain a predetermined body thickness, the body thickness being so correlated with the rate of rotation that the body maintains its cylindrical form, stopping the axial displacement of the liquid at the end of each body to cause a tendency to form a localized annular zone of increased thickness, which tendency is manifest in discharge of the liquid at said end, separately discharging the treating liquid from each body at said end thereof at a rate correlated with the rate of feed and rate of axial movement to maintain the thickness of the body at a predetermined value, moving succeeding portions of the thread helically through the respective liquid bodies in succession and collecting the thread.

6. A method for the after-treatment of thread that comprises moving succeeding portions of a thread helically through a plurality of cylindrical, adjacent, independent rotating bodies of treating liquid horizontally arranged and in axial alignment, maintaining a substantially dry annular zone intermediate said independent rotating bodies, and moving said thread through said dry zone in the form of a helix of increased radial dimensions.

7. A method for the after-treatment of thread that comprises moving succeeding portions of a thread helically through a plurality of cylindrical, adjacent, independent rotating bodies of treating liquid horizontally arranged and in axial alignment, maintaining a substantially dry annular zone intermediate said independent, rotating bodies, and moving said thread through said dry zone in a polygonal path of generally helical form having a maximum radial dimension greater than the dimension of the adjacent helices moving through bodies of treating liquid.

8. A method for the after-treatment of thread that comprises moving succeeding portions of a thread in a generally helical manner through a plurality of cylindrical, adjacent, independent, rotating bodies of treating liquid horizontally arranged and in axial alignment while axially displacing succeeding portions of the component liquid of the body toward one end thereof and stopping the axial displacement at said end to cause the formation of a localized arcuate zone of increased liquid thickness between adjacent bodies, and moving said thread in a generally helical path through said zone of increased thickness, the radial dimensions of said path being greater than those defined by the thread in its helical movement through said bodies.

9. A method for the after-treatment of thread that comprises moving succeeding portions of a thread in a generally helical manner through a plurality of cylindrical, adjacent, independent, rotating bodies of treating liquid horizontally arranged and in axial alignment while axially displacing succeeding portions of the component liquid of the body toward one end thereof and stopping the axial displacement at said end to cause the formation of a localized arcuate zone of increased liquid thickness between adjacent bodies, and moving said thread through said zone of increased thickness in a polygonal path of generally helical form having a maximum radial dimension greater than the radial dimension of the adjacent helices moving through bodies of treating liquid.

10. A method for the after-treatment of thread that comprises moving succeeding portions of a thread in a generally helical manner through a plurality of cylindrical, adjacent, independent, rotating bodies of treating liquid horizontally arranged and in axial alignment while axially displacing succeeding portions of the component liquid of the body toward one end thereof and stopping the axial displacement at said end to cause the formation of a localized arcuate zone of increased liquid thickness between adjacent bodies, maintaining a substantially dry annular zone intermediate said independent rotating bodies, and moving said thread in a generally helical path through said zone of increased thickness and said dry zone, the radial dimensions of said path being greater than those defined by the thread in its helical movement through said bodies.

11. A method for the after-treatment of thread that comprises moving succeeding portions of a thread in a generally helical manner through a plurality of cylindrical, adjacent, independent, rotating bodies of treating liquid horizontally arranged and in axial alignment while axially displacing succeeding portions of the component liquid of the body toward one end thereof and stopping the axial displacement at said end to cause the formation of a localized arcuate zone of increased liquid thickness between adjacent bodies, maintaining a substantially dry annular zone intermediate said independent rotating bodies, and moving said thread through said dry zone and said zone increased thickness in a polygonal path of generally helical form having a maximum radial dimension greater than the radial dimension of the adjacent helices moving through bodies of treating liquid.

12. A method for the countercurrent aftertreatment of thread which comprises moving succeeding portions of a thread helically downwardly through a portion of a cylindrical, rotating body of treating liquid disposed in slightly inclined relation to the horizontal while axially displacing succeeding portions of the component liquid of the body upwardly toward one end thereof.

HERBERT O. NAUMANN.

REFERENCES CITED

The following references are of record in the file of this patent:

UNITED STATES PATENTS

| Number | Name | Date |
|---|---|---|
| 2,272,182 | Burkholder et al. | Feb. 10, 1942 |
| 2,272,233 | Walters | Feb. 10, 1942 |
| 2,302,620 | Lovett | Nov. 17, 1942 |
| 2,303,052 | Kline et al. | Nov. 24, 1942 |
| 2,416,533 | Naumann | Feb. 25, 1947 |

FOREIGN PATENTS

| Number | Country | Date |
|---|---|---|
| 711,207 | Germany | Sept. 27, 1941 |